United States Patent
Delvecchio

(10) Patent No.: US 10,676,990 B2
(45) Date of Patent: Jun. 9, 2020

(54) MOTORIZED WINDOW SHADES FOR RVS

(71) Applicant: Thomas L Delvecchio, Middlebury, ID (US)

(72) Inventor: Thomas L Delvecchio, Middlebury, ID (US)

(*) Notice: Subject to any disclaimer, the term of this patent is extended or adjusted under 35 U.S.C. 154(b) by 43 days.

(21) Appl. No.: 15/732,105

(22) Filed: Sep. 19, 2017

(65) Prior Publication Data

US 2019/0085630 A1    Mar. 21, 2019

(51) Int. Cl.
| | |
|---|---|
| *B60J 1/20* | (2006.01) |
| *E06B 9/72* | (2006.01) |
| *E06B 9/44* | (2006.01) |
| *E06B 9/66* | (2006.01) |
| *E06B 9/62* | (2006.01) |
| *E04F 10/06* | (2006.01) |

(Continued)

(52) U.S. Cl.
CPC .............. *E06B 9/72* (2013.01); *B60J 1/2016* (2013.01); *B60J 1/2019* (2013.01); *B60J 1/2061* (2013.01); *E04F 10/06* (2013.01); *E04F 10/0655* (2013.01); *E06B 9/42* (2013.01); *E06B 9/44* (2013.01); *E06B 9/62* (2013.01); *E06B 9/66* (2013.01); *B60Y 2200/147* (2013.01); *E06B 9/58* (2013.01); *E06B 2009/405* (2013.01)

(58) Field of Classification Search
CPC ........ E06B 2009/405; E06B 9/72; E06B 9/42; E06B 9/62; E06B 9/66; E06B 9/44; E06B 9/58; B64C 1/1484; B60J 1/2013; B60J 1/2066; B60J 1/208; B60J 1/2083; B60J 1/2016; B60J 1/2019; B60J 1/2025; B60J 1/2061; E04F 10/06; E04F 10/0655; B60Y 2200/147

See application file for complete search history.

(56) References Cited

U.S. PATENT DOCUMENTS

| | | | |
|---|---|---|---|
| 1,441,501 A | * | 1/1923 Hein ...................... | B60J 1/2063 160/122 |
| 1,459,180 A | * | 6/1923 Hein ...................... | B60J 1/2069 160/122 |

(Continued)

*Primary Examiner* — Daniel P Cahn
(74) *Attorney, Agent, or Firm* — Ryan M. Fountain

(57) ABSTRACT

A motorized shade assembly is provided having a discontinuous web extending between two rollers, one of which is motorized and the other is tensioned or biased toward rotation away from the other roller. The roller motor can be mounted inside of one of the rollers, and the tensioning device, such as a torsion spring, can be mounted inside of the other roller. The web includes a shade portion and a strap portion, with a rigid draw bar at the junction of those portions. Rotation of the rollers causes the strap portion to wrap over one of the rollers as the shade portion unwraps from the other roller. The shade assembly can be positioned between an inclined or curved vehicle window and an interior shroud for the window, such as found with a cab-over window of a Class B motorhome. The draw bar and fasteners connecting the strap to the draw bar facilitate movement of the shade when in contact with the shroud. Friction reducing tape or surface treatment on the periphery of the window opening in the shroud can also facilitate movement of the shade when in contact with the shroud. Motor actuation can be hardwired to a desired location within the vehicle, or wirelessly controlled by the user, as with an RF device.

3 Claims, 3 Drawing Sheets

(51) Int. Cl.
 *E06B 9/42* (2006.01)
 *E06B 9/58* (2006.01)
 *E06B 9/40* (2006.01)

(56) References Cited

U.S. PATENT DOCUMENTS

| | | | | |
|---|---|---|---|---|
| RE15,904 E * | 8/1924 | Hein | ............... | B60J 1/2069 160/22 |
| 1,539,774 A * | 5/1925 | Sato | ............... | E06B 9/66 160/237 |
| 1,830,364 A * | 11/1931 | Knudson | ............... | F24B 1/192 126/547 |
| 2,404,257 A * | 7/1946 | Thomas | ............... | E06B 9/54 160/133 |
| 2,474,747 A * | 6/1949 | Madriguera | ............... | E06B 9/52 160/237 |
| 2,530,218 A * | 11/1950 | Barrows | ............... | E06B 9/264 160/122 |
| 2,870,831 A * | 1/1959 | Peselnick | ............... | E06B 9/24 160/113 |
| 4,766,941 A * | 8/1988 | Sloop | ............... | E06B 9/24 160/241 |
| 4,815,515 A * | 3/1989 | Lee | ............... | E06B 9/40 160/23.1 |
| 5,467,266 A * | 11/1995 | Jacobs | ............... | B60J 1/2016 160/1 |
| 5,547,009 A * | 8/1996 | Plumer | ............... | E06B 9/70 160/265 |
| 6,086,133 A * | 7/2000 | Alonso | ............... | B60J 1/2019 160/23.1 |
| 6,530,414 B2 * | 3/2003 | Mayr | ............... | E06B 3/6722 160/310 |
| 6,915,988 B2 * | 7/2005 | Sanz | ............... | B60J 1/2041 160/23.1 |
| 7,481,260 B2 * | 1/2009 | Hagen | ............... | E06B 9/42 160/265 |
| 8,069,597 B2 * | 12/2011 | Kim | ............... | G09F 11/29 40/471 |
| 2008/0277077 A1 * | 11/2008 | Rockelmann | ............... | B60J 1/2041 160/268.1 |
| 2014/0209746 A1 * | 7/2014 | Dunn | ............... | B60J 1/2019 244/129.3 |
| 2015/0061324 A1 * | 3/2015 | Sinclair | ............... | B60J 1/2094 296/191 |
| 2017/0361690 A1 * | 12/2017 | Higuchi | ............... | E06B 9/42 |

* cited by examiner

MOTORIZED WINDOW SHADES FOR RVS

BACKGROUND OF THE INVENTION

The present invention relates to motorized window shades, and, more particularly to shades for inclined or curved windows mounted in vehicles, such as recreational vehicles (RVs), especially those windows in cab-over locations of Class B RVs.

A wide variety of window shades have been used. In general, these shades permit the users to selectively cover and uncover some or all of a window opening, as desired to control the amount of light coming into a window and/or to control visibility through the window. For the convenience of the user, and especially where the window is less readily accessible, some prior window shades have been operable via motors. Motorized shades can perform their function well in connection with modest sized, vertical windows in static structures, such as those windows found in traditional residences.

However, motorized shades tend to be more expensive than manually operable shades, and typically require more bulky mechanisms. For example, manually operable shades may not have the same top-to-bottom alignment problems in use, because only a single roller can suffice, with bottom "fall" being adjustable by the using during actuation. Motorized shades using top and bottom rollers, however, usually need a means of ensuring proper alignment between the rollers, especially over an extended period of time. Alignment solutions which have been available for those motorized shades often employ heavy, expensive, and/or oversized frames or structural features.

Further, motorized (as well as manual) shades used in static structures have run into operational difficulties where the window to be covered is inclined with respect to the vertical plane and/or has a curvature into the horizontal plane. Especially in connection with wide windows, using shades with inclined or curved windows runs the risk of shade sag, or spacial separation from the desired window distance to be maintained by the shade from the window. Prior shades have reduced sag by forming the shade web from rigid material, but that often increases shade cost and weight. Other attempts to prevent or reduce shade sag have involved the use of guide wires and/or web tensioning rollers at the bottom of the shade. However, in addition to increasing cost and overall weight of the shade assembly, such devices increase the actuation torque needed by operating motors (often requiring a larger and/or more expensive motor) or the force needed to be exerted by the manual user.

Further, using shades in vehicles can create additional difficulties. Spacial constraints in vehicles are generally more severe than in static structures. For example, window openings in vehicles are often shrouded or shielded with respect to the adjacent wall structure. Thus, whatever shade is to be used should conform to the wall thickness if significant intrusion into the users space of the vehicle is to be avoided. This can, for example, be on the order of only a couple inches of lateral space, and sometimes less.

Also, since it is usually desirable to keep overall vehicle weight low, for a variety of reasons (including fuel economy), component weight should be minimized as well. Thus, some of the frame and support structures that may be acceptable for motorized shades in static structures is not well suited for use in vehicles. Similarly, costs that may be acceptable for motorized shades in residences and office buildings are not acceptable for production of vehicles, where the user market for vehicles can be much more price sensitive.

These concerns about applying prior motorized shade assemblies to vehicles are often heightened and/or compounded in connection with RVs. Windows in RVs, such as Class B motorhomes, can be found, for example, in the cab-over sleeping compartment. Such windows are, for example, curved and/or inclined, with the bottom portion being relatively inaccessible to the user without significant effort. Also, it is sometimes preferable to make such cab-over windows relatively wide, extending nearly the width of the RV. For user safety, insulation, and/or aesthetic appeal, cab-over windows often have an interior molded plastic shroud (formed from ABS, for example) closely spaced from the window. Prior attempts to use motorized shades for such cab-over windows have encountered shade sag, snagging of the shade web with the side and/or bottom edges of the shroud opening, and misalignment of the shade (even when using cord draw strings, since the "winding diameter" can be non-uniform from time to time). These prior attempts have also involved motorized shades whose cost, installation time, and maintenance have been undesirably high. Also, it can be important in RVs to keep the electric power requirements of feature motors to a minimum, as that the RV has less costly and/or heavy battery requirements when camping remote from an external source of electric power.

OBJECTIVES OF THE INVENTION

Accordingly, a primary objective of the present invention is to provide improved motorized window shades, especially for use in RVs. These improvements include providing such arrangements which:
  a. are inexpensive to make, install, and maintain,
  b. require minimal space to mount adjacent a window,
  c. cover inclined or curved windows without sagging and/or misalignment,
  d. minimize component weight,
  e. operate efficiently and reliably adjacent a window shroud, and
  f. increase the aesthetic appeal of the RV.

SUMMARY OF THE INVENTION

These and other objectives of the present invention are achieved by the provision of a motorized shade assembly having a discontinuous web extending between two rollers, one of which is motorized and the other is tensioned or biased toward rotation away from the other roller. The roller motor can be mounted inside of one of the rollers, and the tensioning device, such as a torsion spring, can be mounted inside of the other roller. The web includes a shade portion and a strap portion, with a rigid draw bar at the junction of those portions. Rotation of the rollers causes the strap portion to wrap over one of the rollers as the shade portion unwraps from the other roller. The shade assembly can be positioned between an inclined or curved vehicle window and an interior shroud for the window, such as found with a cab-over window of a Class B motorhome. The draw bar and fasteners connecting the strap to the draw bar facilitate movement of the shade when in contact with the shroud. Friction reducing tape or surface treatment on the periphery of the window opening in the shroud can also facilitate movement of the shade when in contact with the shroud.

Motor actuation can be hardwired to a desired location within the vehicle, or wirelessly controlled by the user, as with an RF device.

Other objects, advantages, and novel features of the present invention will become readily apparent from the following drawings and detailed description of certain preferred and alternative embodiments.

DETAILED DESCRIPTION OF PREFERRED EMBODIMENTS

Figure 1:
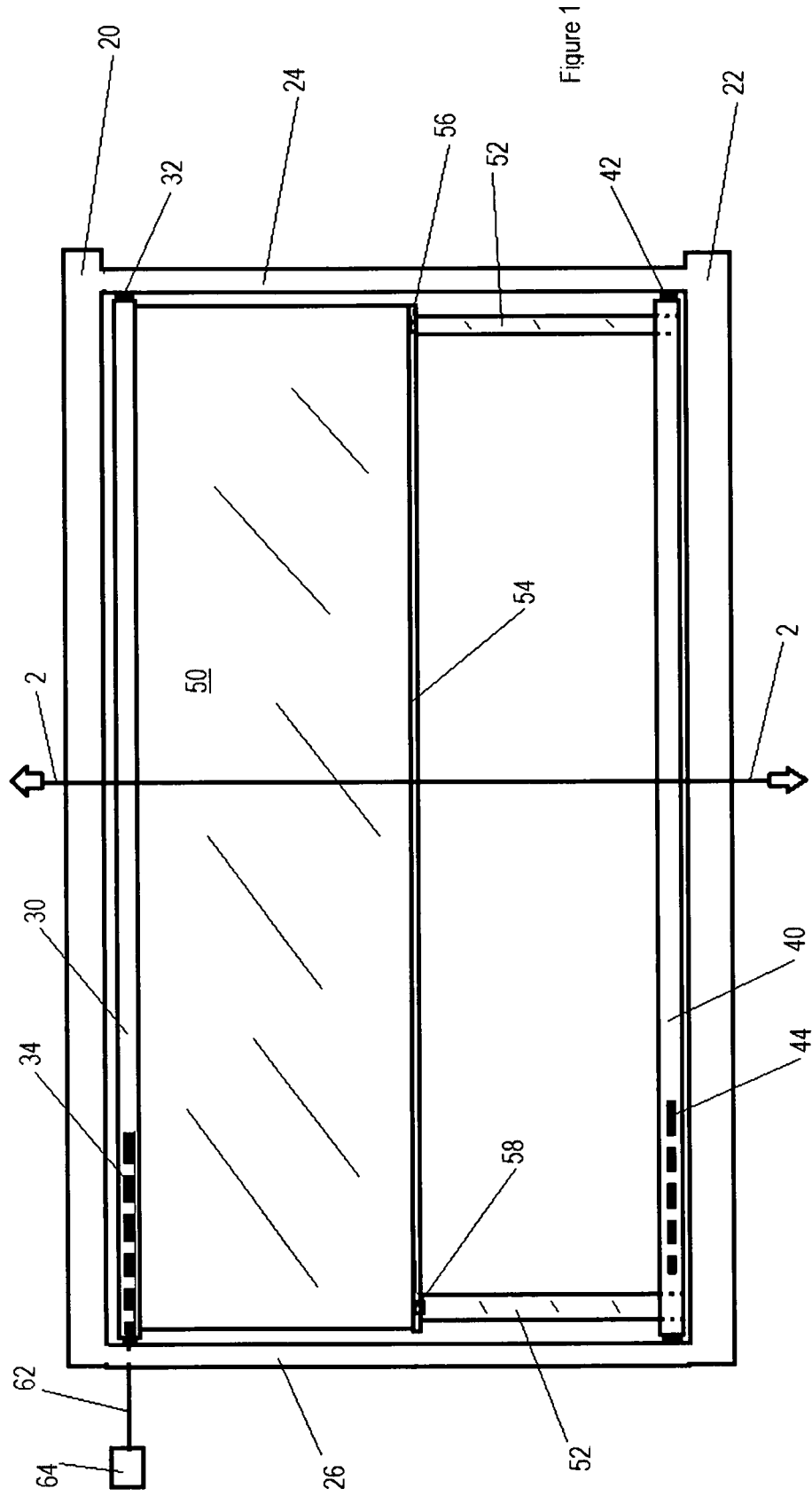
FIG. 1 is a forward looking, plan view of a motorized shade assembly incorporating the present invention therein, as would be seen from inside of a vehicle with the window shroud removed, and the discontinuous web arranged to move from under to over in rotation.
Figure 2:
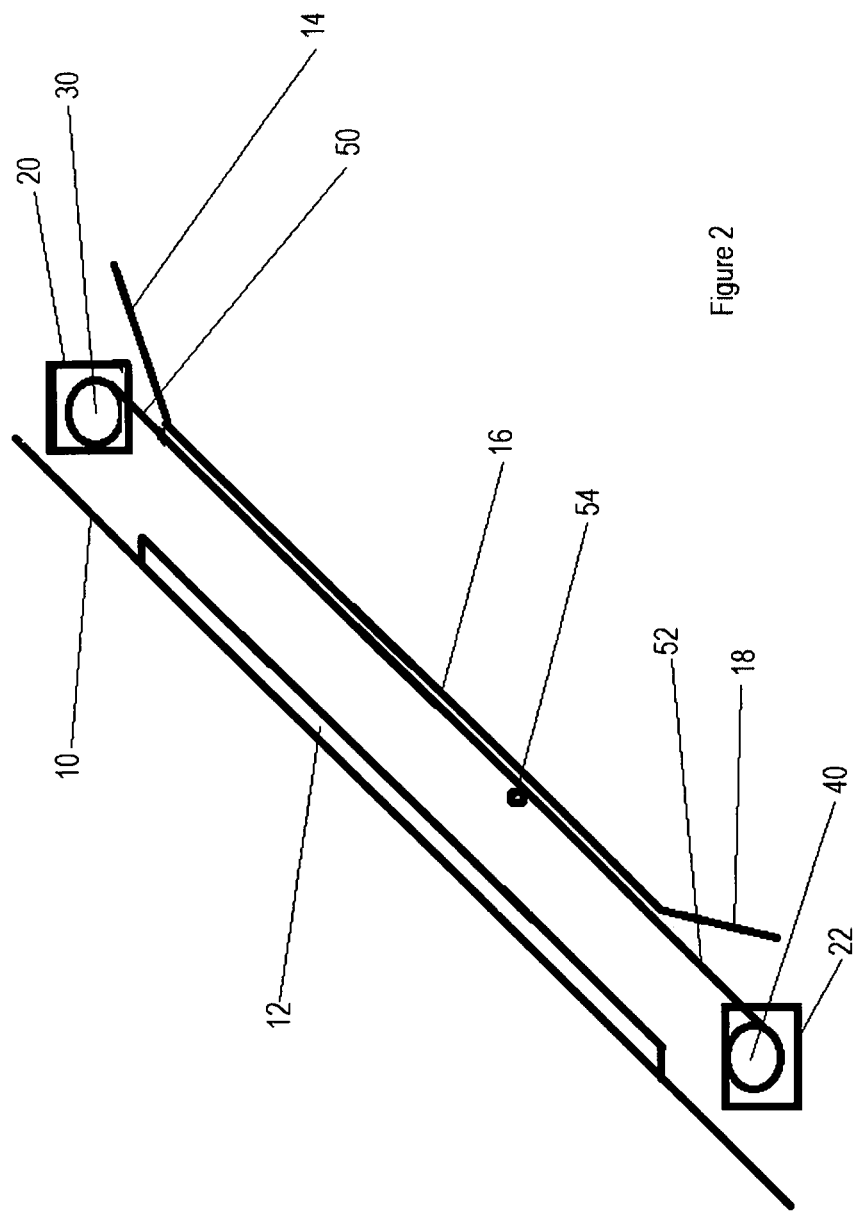
FIG. 2 is a cross-sectional view of the embodiment of FIG. 1 taken along line 2-2, as mounted in a portion of a vehicle having an inclined window, with the window shroud in place, and with the discontinuous web alternatively arranged to move from under to under in rotation.
Figure 3:
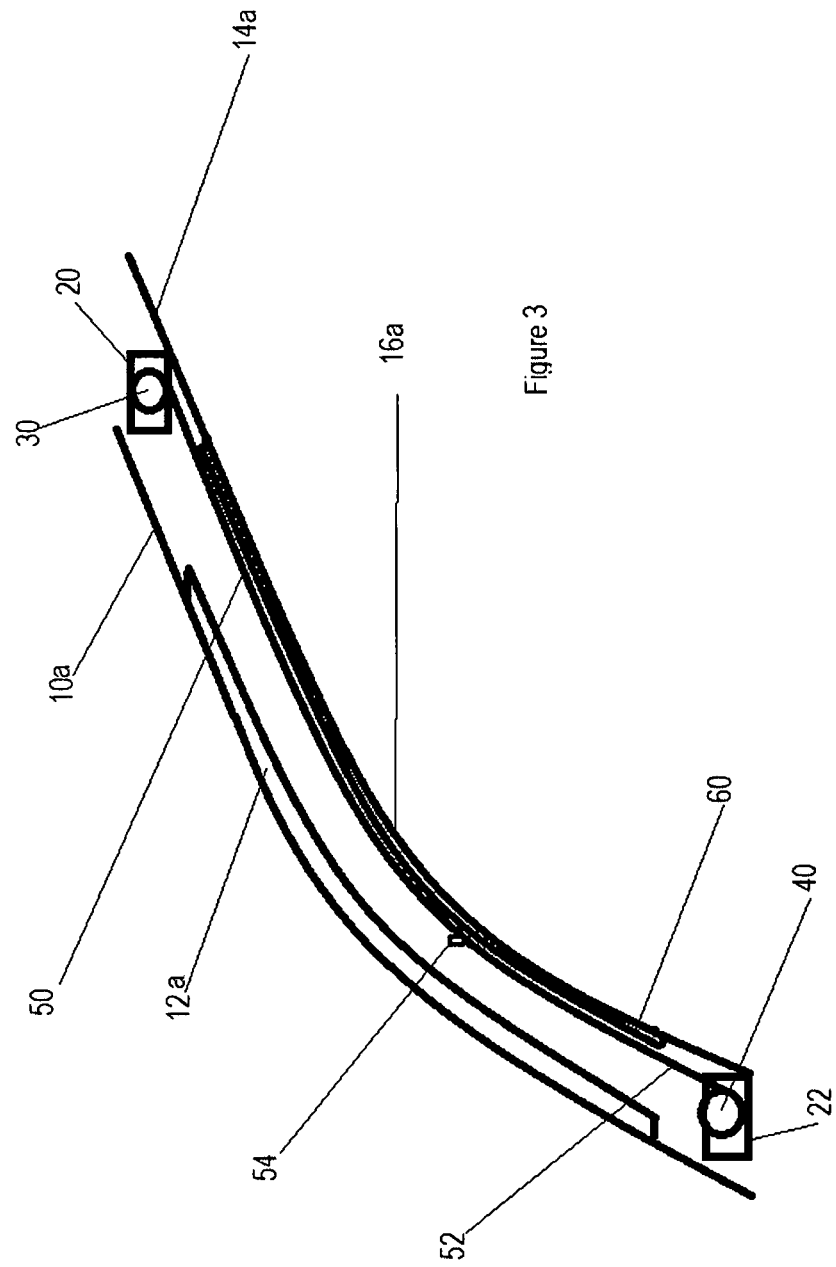
FIG. 3 is a cross-sectional view of the embodiment of FIG. 1 taken along line 2-2, as mounted in a portion of a vehicle having, alternatively, a curved inclined window, with the window shroud in place, and with the discontinuous web arranged to move from under to under in rotation.

FIGS. 1-3 show schematically, multiple embodiments of the present invention, as applicable to vehicles, such as Class B motorhome RVs. The following features are illustrated in those drawings:

a vehicle 10, having a wall into which an inclined window 12 or curved window 12a is mounted (such as a cab-over window in a Class B motorhome), the vehicle typically resting on a generally horizontal plane of reference, such as a road or the ground, a window shroud 14 or 14a, typically mounted inside of vehicle 10 and in close proximity to window 12 or 12a, respectively, the distance therebetween forming a wall thickness for vehicle 10, an opening 16 or 16a in the window shroud, that opening generally corresponding in location and dimension to the location and dimension of corresponding window 12 or 12a, respectively, an elevational or aesthetic feature 18 of shroud 14, altering the topography of that shroud in certain instances, and thereby changing the wall thickness for vehicle 10 at that location, a frame assembly for ease of installation, maintenance, and alignment of the shade assembly, including at least upper strut 20, lower strut 22, right strut 24, and left strut 26, and preferably formed from rigid aluminum tubing or like material, upper roller 30, rotatably mounted to struts 24 and 26 adjacent to strut 20, by means of one or more end brackets 32, lower roller 40, rotatably mounted to struts 24 and 26 adjacent to strut 22 by means of one or more end brackets 42, motor 34 for rotating upper roller 30 alternatively in either direction of rotation, preferably mounted inside of roller 30 and selectively operated by means of user controller 64, connected to motor 34 through wires 62, tensioning device 44, such as a torsion spring, for biasing lower roller 40 toward rotation away from upper roller 30, preferably mounted inside of roller 40, shade web 50, such as an opaque or translucent fabric or sheet of material, connected to upper roller 30, so to be rotatably wound up on that roller for containment or storage, and unwound toward lower roller 40 to provide coverage of window 12 or 12a, as selected by the user, when motor 34 is actuated, straps 52 connected to lower roller 40, so as to be rotatably wound up on that roller to provide coverage of window 12 or 12a by shade web 50, and unwound toward upper roller 30 for containment or storage of shade web 50, as selected by the user when motor 34 is actuated, draw bar 54 connected to shade web 50 and to straps 52, preferably formed from a rigid, smooth sided material, such as molded plastic, and color coordinated with shade web 50 for aesthetic appeal, the rigidity of this draw bar being selected to inhibit sagging of shade web 50 over its lateral expanse (the width of window 12 or 12a), as the shade web is being drawn toward roller 40, right and left fasteners 56 and 58, respectively, for connecting straps 52 to the right and left sides of draw bar 54, preferably connecting straps 52 to the back (or hidden) side of draw bar 54 (as seen from the view of FIG. 1) or the lower side of draw bar 54 (as would be seen from the views of FIGS. 2 and 3), such that an exposed portion of these fasteners are adjacent the window shroud, and these fasteners each preferably connecting draw bar 54 to the straps 52 with a slightly raised head portion exposed from the surface of straps 52, which is formed and dimensioned so as to facilitate movement of the shade web with respect to the shroud, such as with a smooth rivet or button-like connection of the fastener, and friction reducing tape or surface treatment 60 (such as a smooth foam or Mylar based tape), applied to at least a portion of the periphery of opening 16 or 16a (such as its sides and/or bottom edge areas), so as to reduce the friction from sliding of straps 52, draw bar 54, and/or shade web 40 against the shroud, as well as to reduce the potential for the shroud snagging, marring, or damaging those elements.

When shade web 50 and straps 52 are joined, as shown herein, a discontinuous web is formed which extends between rollers 30 and 40. Preferably, straps 52 are positioned so as to not block visibility through opening 16 or 16a, such as by placing the straps no closer to each other than the maximum width of opening 16 or 16a. In certain embodiments straps 52 may rest on or be guided by the periphery of that opening during operation of the shade assembly, particularly if the window is enlarged toward the full width of the vehicle. Similarly, draw bar 54 may rest on or be guided by the periphery of opening 16 or 16a. Thus, friction reducing tape can facilitate movement of the shade as it is being operated, especially in conjunction with exposed heads of fasteners 56 and 58.

In certain embodiments, the discontinuous web of the shade elements are wrapped from the underside of both rollers 30 and 40, as seen in FIGS. 2 and 3. In other embodiments, the discontinuous web can be wrapped in the opposite direction, or, as seen in FIG. 1, from the underside of one roller (upper roller 30 in the embodiment of that drawing) to the top side of the other roller (roller 40 in the embodiment of that drawing).

In certain embodiments, only a single motor 34 and single torsion spring 44 can be employed. In alternative embodiments, motor 34 and torsion spring 44 are positioned on each end of rollers 30 and 40, respectively. Also, while a hard-wired control arrangement is shown in the drawings with elements 62 and 64, alternative embodiments of the present invention can use a wireless controller instead of those elements, by application of conventional motor control devices.

To facilitate production, installation, and/or maintenance, the shade assembly of the present invention can be mounted into frame assembly outside of the vehicle, and then the frame assembly as a whole can be placed within the vehicle. In other embodiments, the frame assembly can be mounted within the vehicle separately, and then the other shade assembly elements installed to the frame assembly. Also, while the preferred embodiments described herein are directed specifically to vehicles, the present invention is readily adaptable for use in static structures and the like, especially where inclined or curved windows are involved.

Thus, although the present invention has been shown and described herein with respect to certain preferred embodiments and alternative configurations, those were by way of illustration and example only. Accordingly, the spirit and scope of the present invention is intended to be limited only by the terms of the appended claims.

What is claimed is:

1. A shade arrangement comprising:
   an upper roller,
   a shade web attached to the upper roller,
   a draw bar attached to the shade web,
   at least one strap attached to the draw bar,
   a lower roller attached to the strap,
   a motor mounted inside of the upper roller, wherein the upper roller is configured to be driven by the motor to rotate and thereby wind and unwind the shade web onto the upper roller, according to a direction of rotation of the motor,
   a torsion spring mounted inside of the lower roller, wherein the lower roller is biased to rotate and thereby wind or unwind the strap onto the lower roller, according to the direction of rotation of the motor,
   a rigid frame into which the upper roller and the lower roller are mounted at spaced apart locations,
   a window and a window shroud mounted adjacent to the window, the window shroud having an opening therein which corresponds with a location and dimension of the window, and the rigid frame is mounted therebetween with the upper roller and the lower roller positioned above and below the window respectively,
   a vehicle having a window opening into which the window is mounted such that a plane of the window is at an angle to a horizontal plane of reference for the vehicle,
   wherein the shade web overlays the opening of the window shroud, and the opening of the window shroud includes a friction reducing means over at least a portion of a periphery of the window shroud upon which the draw bar and portions of the shade web can slide.

2. The shade arrangement according to claim 1 wherein the strap is attached to the draw bar by a fastener having a raised portion, the raised portion being mounted on a side of the strap adjacent to the window shroud.

3. The shade arrangement according to claim 2 wherein the strap comprises a first strap and a second strap, each of the first and second straps attached to the draw bar and the lower roller, the first and second straps being spaced apart and located no closer to each other than a width of the opening of the window shroud, each of the first and second straps being connected to the draw bar by the fastener respectively, the raised portion of each said fastener having a surface and dimension formed so as to facilitate motion of the draw bar past the periphery of the opening of the window shroud.

* * * * *